Oct. 24, 1944.  H. JEFFRIES  2,361,293
RETRACTILE FLOAT AND LANDING GEAR FOR SEA PLANES
Filed Feb. 5, 1943  6 Sheets-Sheet 3

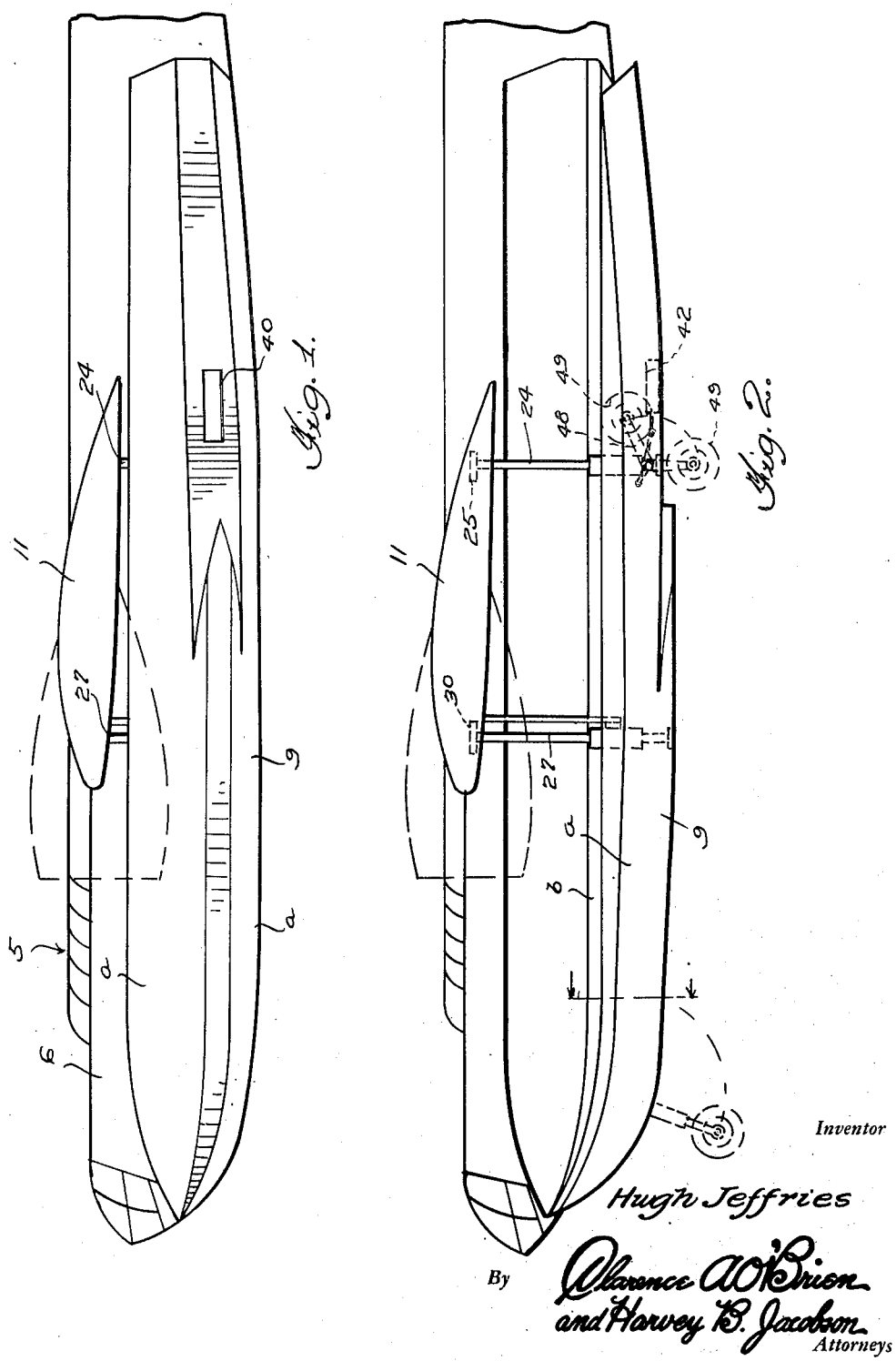

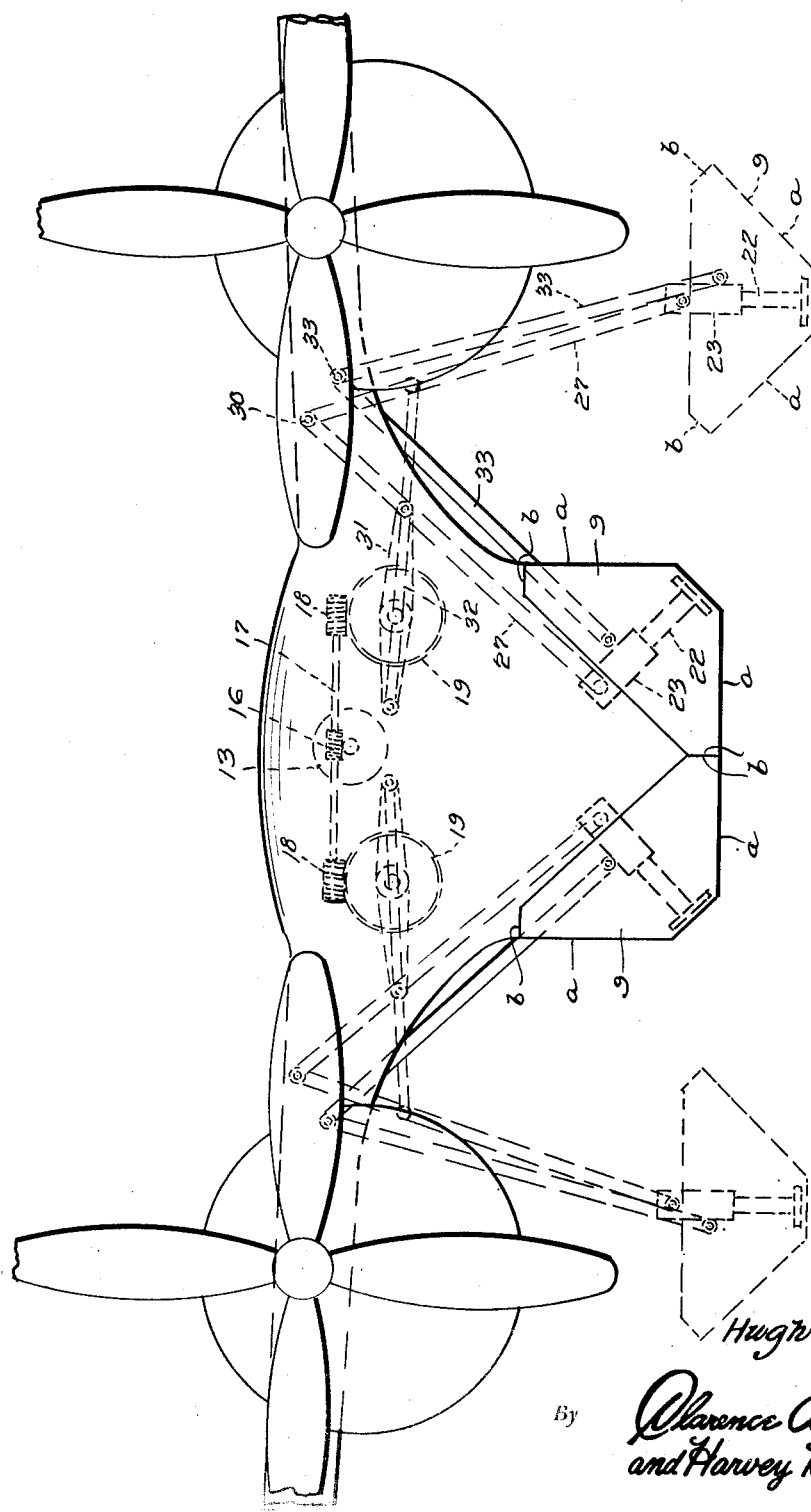

Inventor
Hugh Jeffries

By Clarence A. O'Brien
and Harvey B. Jacobson
Attorneys

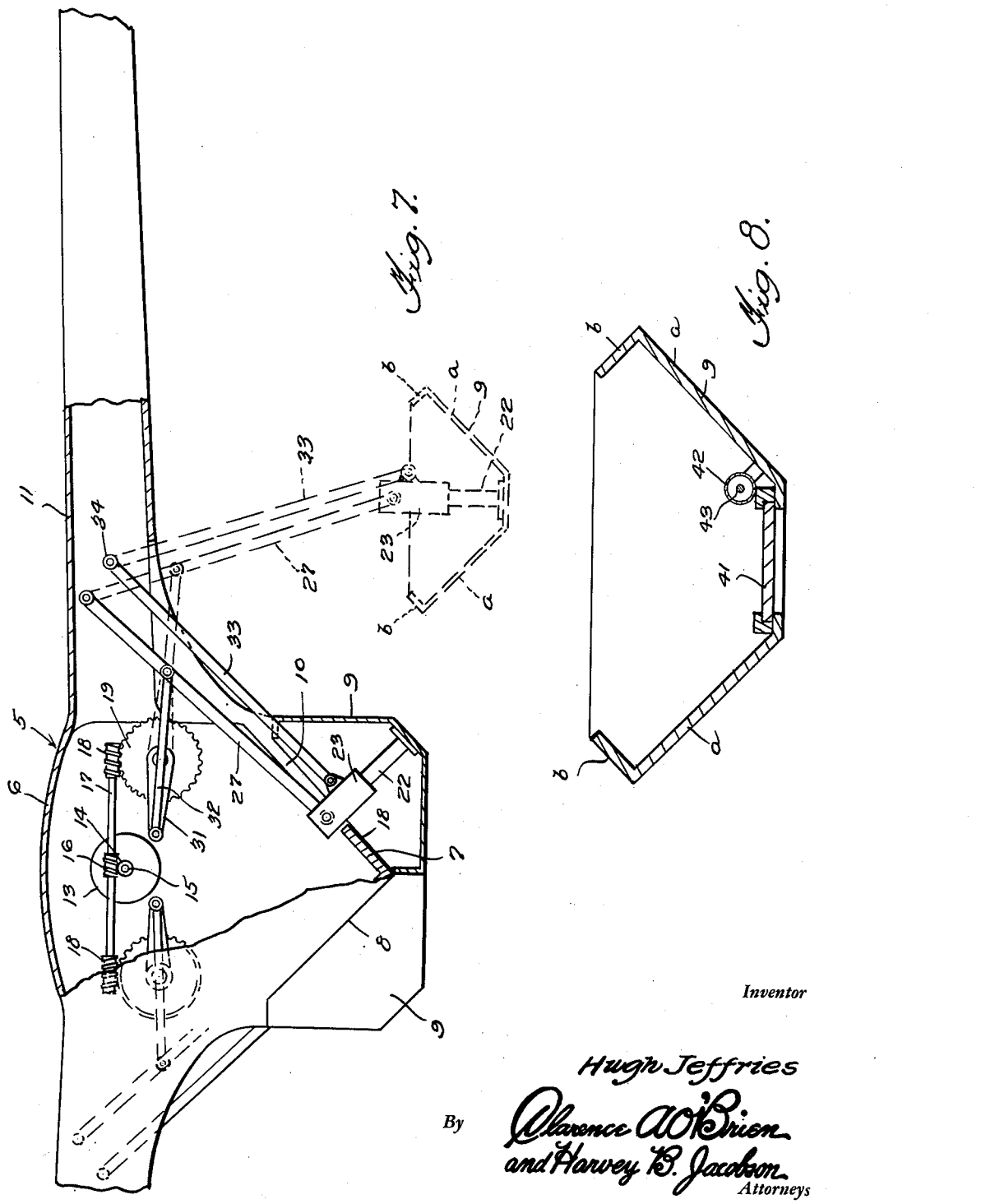

Oct. 24, 1944.   H. JEFFRIES   2,361,293
RETRACTILE FLOAT AND LANDING GEAR FOR SEA PLANES
Filed Feb. 5, 1943   6 Sheets-Sheet 5

Inventor
Hugh Jeffries
By Clarence A. O'Brien
and Harvey B. Jacobson
Attorneys

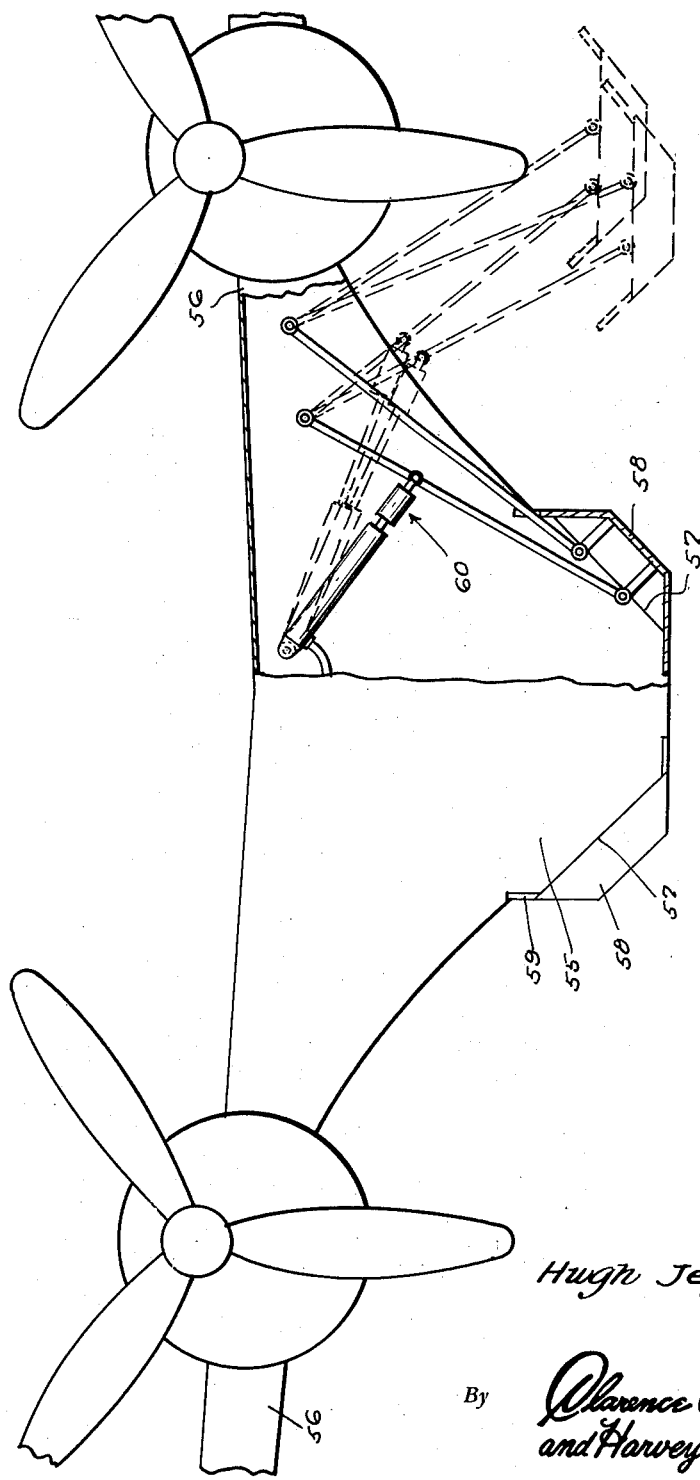

Patented Oct. 24, 1944

2,361,293

UNITED STATES PATENT OFFICE 2,361,293

RETRACTILE FLOAT AND LANDING GEAR FOR SEAPLANES

Hugh Jeffries, Los Angeles, Calif.

Application February 5, 1943, Serial No. 474,858

3 Claims. (Cl. 244—102)

This invention relates to new and useful improvements in aeronautics and more particularly to improvements in sea plane construction.

The principal object of the present invention is to provide an improved sea plane employing pontoons which are retractable.

Another important object of the invention is to provide a sea plane having pontoons wherein the pontoons are retractable to a position against the under and side portions of the fuselage, thus eliminating the air resistance that is now incurred by conventional pontoons while the aircraft is in flight.

Another important object of the invention is to provide a sea plane having retractable pontoons wherein both the fuselage of the plane and the pontoons serve to support the ship when on the surface of water.

Still another important object of the invention is to provide retractable pontoons for aircraft which can be retracted to a position conforming with the curvature of the fuselage of the complementary aircraft.

A further object of the invention is to provide a sea plane having pontoons on which are mounted retractable wheels to permit landing.

Other objects and advantages of the invention will become apparent to the reader of the following description.

In the drawings—

Figure 1 represents a fragmentary side elevational view showing a sea plane with the pontoons retracted.

Figure 2 is a fragmentary side elevational view showing the pontoons extended.

Figure 3 is a fragmentary front elevational view of a sea plane with the pontoons retracted.

Figure 7 is a fragmentary front elevational view of the sea plane showing one of the operating mechanisms and in broken line showing the approximate position of one of the pontoons when extended.

Figure 8 is an enlarged cross sectional view of one of the pontoons at the retractable wheel closure.

Figure 12 is a fragmentary front elevational view disclosing a modified form of ship and pontoon construction.

Figure 4:
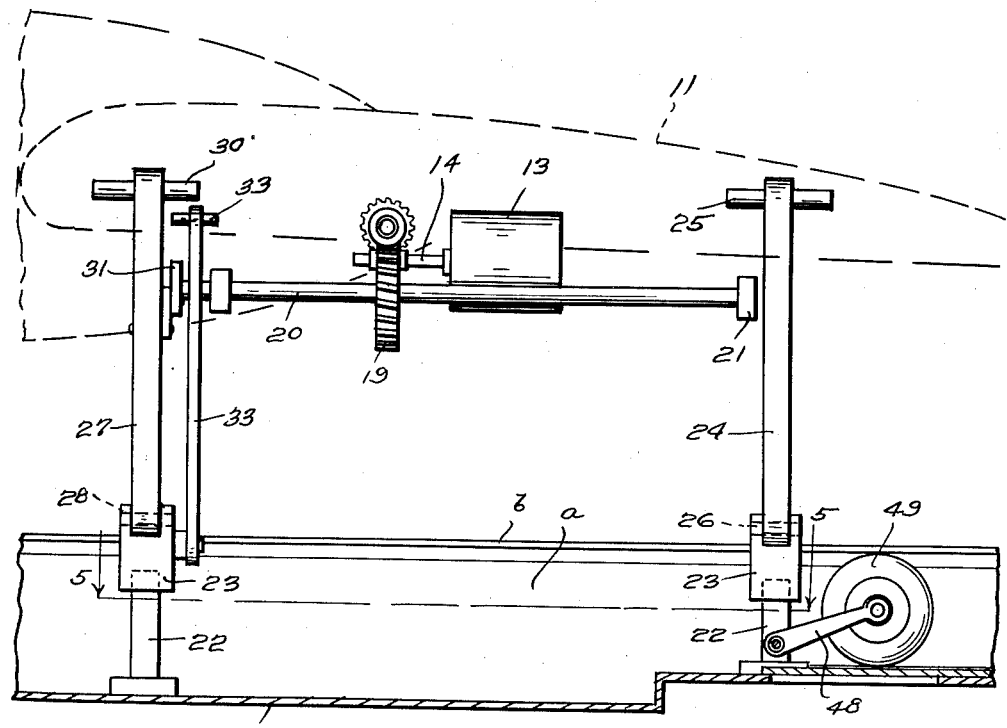
Figure 4 is a fragmentary detailed sectional view showing one of the pontoons and its operating mechanism.

Referring to the drawings wherein like numerals designate like parts, it can be seen in the drawings that numeral 5 denotes broadly a sea plane which is specially constructed with a fuselage 6 having a downwardly tapering bottom portion 7 defining sloping sides 8. 8 against which specially constructed pontoons 9, 9 are disposable. Vertically disposed slots 10 are formed in the sloping bottom of the fuselage to accommodate certain mechanism of the pontoons 9.

Figure 5:
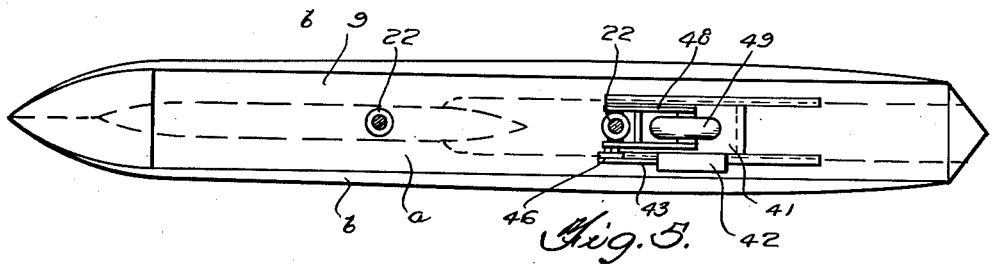
Figure 5 is a sectional view taken substantially on the line 5—5 of Figure 4.
Figure 6:
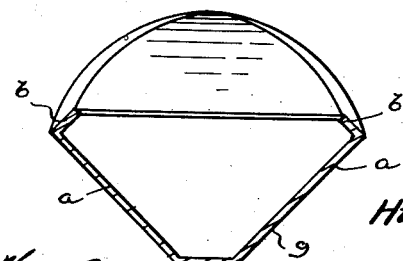
Figure 6 is a cross sectional view of one of the pontoons.

As can be seen in Figures 2 and 5, the pontoons 9 are of elongated construction and extend from a point adjacent the nose of the aircraft to a point substantially midway between the usual wings 11 and the tail assembly of the aircraft. These pontoons are somewhat in the form of kayaks, the same having sloping side walls a. a and inwardly disposed gunwale portions b. The stern end of each is preferably snub while the forward end curves upwardly and comes to a gradual taper.

Numeral 13 denotes a power plant such as an electric motor, operating a shaft 14, which by a gear 15 and meshing with a worm 16 drives a transverse shaft 17 having a worm 18 in each end thereof. Each worm 18 is in mesh with a gear wheel 19 carried by a longitudinally extending shaft 20 which is disposed through suitable bearings 21.

At this point, it can be seen that each pontoon 9 has a pair of risers 22 therein on which rides an air cylinder 23 to absorb shock. From one of the cylinders 23 a strut 24 extends and is supported by a cross pin 25 swingably in the corresponding wing 11. The lower end of the strut 24 is pivotally connected as at 26 to the cylinder 23.

A second strut 27 supports the forward portion of the corresponding pontoon 9, the lower end of the same being pivotally connected as at 28 to the corresponding cylinder 23, while its upper end has a cross pin 30 and is swingably mounted within the corresponding wing 11. Thus the pontoon 9 is swingably supported by the wing 11.

Now reverting to Figure 4, it can be seen that the shaft 20 has an arm 31, the outer end of which is connected by a rod 32 to the upper portion of the strut 27. The cylinder 23 last referred to has the lower end of an orienting bar 33 pivotally secured thereto while its upper end is swingably secured as at 34 within the wing 11. The bar 33 serves to bring the pontoon, when extended, to the upright position shown in broken lines in Figure 7.

Obviously, when the motor 13 is operated, the pontoons 9 are either swung out of useful positions or retracted depending upon the direction of rotation of the motor 13.

Obviously, if desired, the pontoons may be used for carrying reserve supplies of gasoline and perhaps other utilities.

Figure 9:
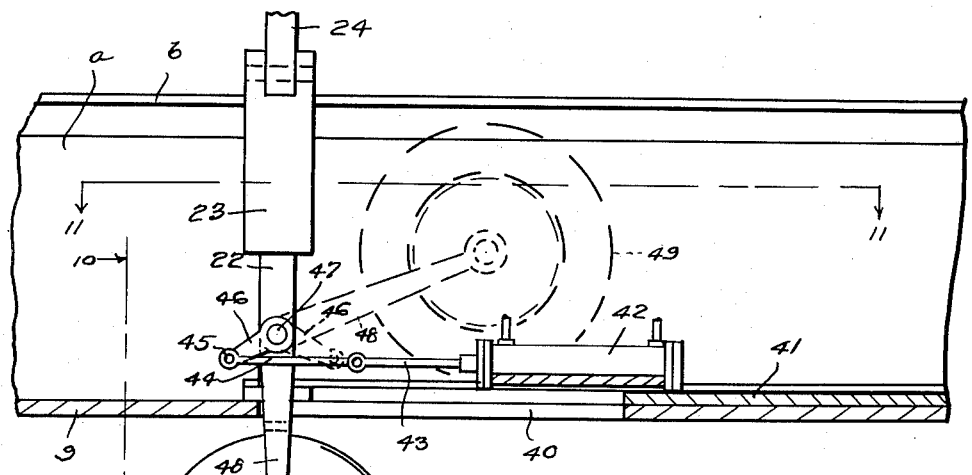
Figure 9 is a fragmentary longitudinal sectional view through one of the pontoons showing the landing wheel in extended position.
Figure 10:
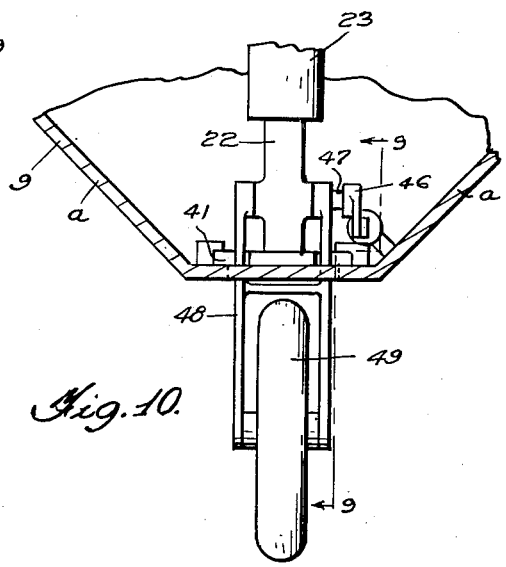
Figure 10 is a sectional view taken substantially on the line 10—10 of Figure 9.
Figure 11:
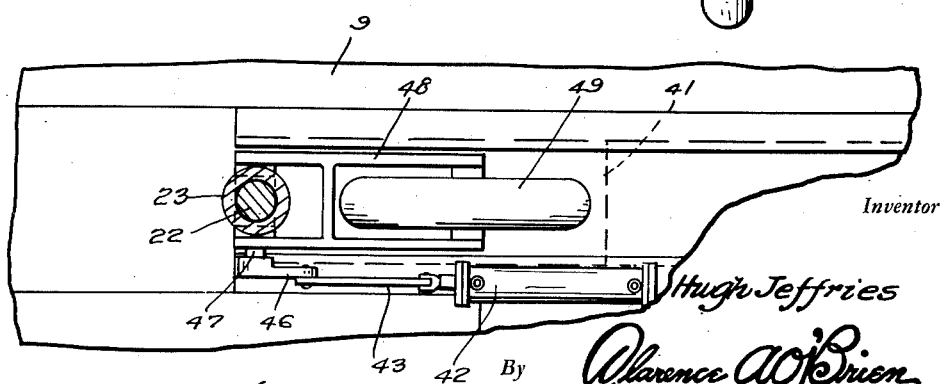
Figure 11 is a section taken substantially on the line 11—11 of Figure 9, but showing the wheel retracted.

Figures 9, 10 and 11 show a retractible landing wheel for each of the pontoons. Each pontoon has an opening 40 in the bottom thereof and slidable over this opening and providing a leak-attached closure is a slide door 41. Mounted upon the bottom of the pontoon is a fluid pressure cylinder 42 from which extends a piston rod 43 connected to a link 44, which in turn is pivotally connected as at 45 to an arm 46 which is suitably secured to a shaft 47, this shaft 47 extending horizontally through the rearmost upright 22 and carrying a fork structure 48 in which is mounted a landing wheel 49.

It can now be seen, that when the wheel is in a depending position shown in Figure 9, and the door 41 opens, operation of the fluid pressure cylinder 42 will result in a pull on the rod 43 and the link 44 which will pull on the arm 46 and cause the wheel 49 to be lifted to the dotted line position shown in Figure 9, the wheel then being disposed within the pontoons.

Figure 12 shows a modified form of the invention, numeral 55 denoting the bottom of the sea plane which, of course, is part of the fuselage, while numerals 56, 56 denote wings projecting laterally therefrom. As can be seen, the portion 55 of the sea plane has its lower side portions formed on inclined planes or bevels 57, 57, pontoons 58, 58 corresponding to the pontoons of the other figures of the drawings in this application are adapted to be retracted against these inclined side portions of the fuselage 55, it being preferable that the pontoons 58, 58 have laterally disposed tongues 59 for overlapping portions of the fuselage bottom 55.

This construction leaves the fuselage portion 55 with a water contactable bottom portion 60 and this portion of the fuselage is utilized as a pontoon when the pontoons are swung laterally to the dotted line position shown in Figure 12. Mechanism generally referred to by numeral 60 and corresponding to the retracting mechanism hereinbefore described can be employed.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

1. A sea plane having a fuselage comprising a main upper part provided at its bottom portion with downwardly converging side walls, lateral wings on said main upper part of the fuselage, a pair of pontoons forming the lower side parts of said fuselage when retracted against said side walls, front and rear struts having their upper ends pivoted in the wings laterally outward of the fuselage and upon axes parallel with the longitudinal axis of the plane, said pontoons being pivoted centrally between their sides to the lower ends of said struts and upon axes parallel with the longitudinal axis of the plane, orienting bars pivoted in the wings and to the pontoons to laterally tilt the pontoons inwardly when retracted and to laterally tilt them to an even keel position when moved outwardly laterally from the main part of the fuselage, and means connected to one strut of each pontoon for retracting and outwardly moving the pontoons.

2. A sea plane having a fuselage comprising a main upper part provided at its bottom portion with downwardly converging side walls, lateral wings on said main upper part of the fuselage, a pair of pontoons forming the lower side parts of said fuselage when retracted against said side walls, front and rear struts having their upper ends pivoted in the wings laterally outward of the fuselage and upon axes parallel with the longitudinal axis of the plane, said pontoons being pivoted centrally between their sides to the lower ends of said struts and upon axes parallel with the longitudinal axis of the plane, orienting bars pivoted in the wings and to the pontoons to laterally tilt the pontoons inwardly when retracted and to laterally tilt them to an even keel position when moved outwardly laterally from the main part of the fuselage, and means connected to one strut of each pontoon for retracting and outwardly moving the pontoons, risers mounted in the pontoons, and shock absorber cylinders on said risers, said struts being pivoted to the upper portions of said cylinders, and said orienting bars being pivoted to the outer sides of certain ones of said cylinders.

3. In a sea plane, a pontoon having a bottom opening, a riser mounted in the pontoon, a supporting strut for the pontoon, a shock absorber cylinder on said riser attached to the lower end of said strut, a mount pivoted on said riser and carrying a landing wheel arranged to move downwardly and forwardly or rearwardly and upwardly through said opening, a crank arm on the mount at its pivot, and a reciprocating fluid pressure motor mounted horizontally in and longitudinally of the pontoon and having a piston rod connected to said crank arm for moving the landing wheel in either direction.

HUGH JEFFRIES.